Nov. 27, 1962  J. G. VERGOBBI  3,065,782
WEB FEEDING AND SPLICING APPARATUS
Filed Dec. 22, 1959  10 Sheets-Sheet 1

INVENTOR.
John G. Vergobbi
BY Robert R. Churchill
ATTORNEY

Nov. 27, 1962 J. G. VERGOBBI 3,065,782
WEB FEEDING AND SPLICING APPARATUS
Filed Dec. 22, 1959 10 Sheets-Sheet 7

INVENTOR.
John G. Vergobbi
BY Robert R. Churchill
ATTORNEY

Nov. 27, 1962     J. G. VERGOBBI     3,065,782
WEB FEEDING AND SPLICING APPARATUS
Filed Dec. 22, 1959     10 Sheets-Sheet 8

INVENTOR.
BY John G. Vergobbi
Robert R. Churchill
ATTORNEY

Nov. 27, 1962  J. G. VERGOBBI  3,065,782
WEB FEEDING AND SPLICING APPARATUS
Filed Dec. 22, 1959  10 Sheets-Sheet 9

INVENTOR.
John G. Vergobbi
BY Robert R. Churchill
ATTORNEY

Nov. 27, 1962 J. G. VERGOBBI 3,065,782
WEB FEEDING AND SPLICING APPARATUS
Filed Dec. 22, 1959 10 Sheets-Sheet 10

INVENTOR.
John G. Vergobbi
BY Robert R. Churchill
ATTORNEY

United States Patent Office 3,065,782
Patented Nov. 27, 1962

3,065,782
WEB FEEDING AND SPLICING APPARATUS
John G. Vergobbi, Quincy, Mass., assignor to Pneumatic Scale Corporation, Limited, Quincy, Mass., a corporation of Massachusetts
Filed Dec. 22, 1959, Ser. No. 861,261
23 Claims. (Cl. 156—504)

This invention relates to web feeding and splicing apparatus particularly adapted for use in a container forming machine.

The invention has for an object to provide novel and improved web feeding apparatus embodying novel web splicing mechanism adapted to automatically splice the trailing end of one web to the leading end of a second web during the continuous advance of the first web in a novel and efficient manner.

Another object of the invention is to provide novel and improved web feeding apparatus of the character specified having provision for severing and advancing successive leading portions of the continuously advanced web into predetermined lengths, and wherein novel provision is made for automatically controlling the location of the spliced portion of the web relative to a length severed from the leading end of the web so that the splice will occur intermediate the ends of the subsequently severed length.

With these general objects in view and such others as may hereinafter appear, the invention consists in the web feeding and splicing apparatus and in the various structures, arrangements and combinations of parts hereinafter described and particularly defined in the claims at the end of this specification.

In the drawings illustrating the preferred embodiment of the invention:

Figure 1:
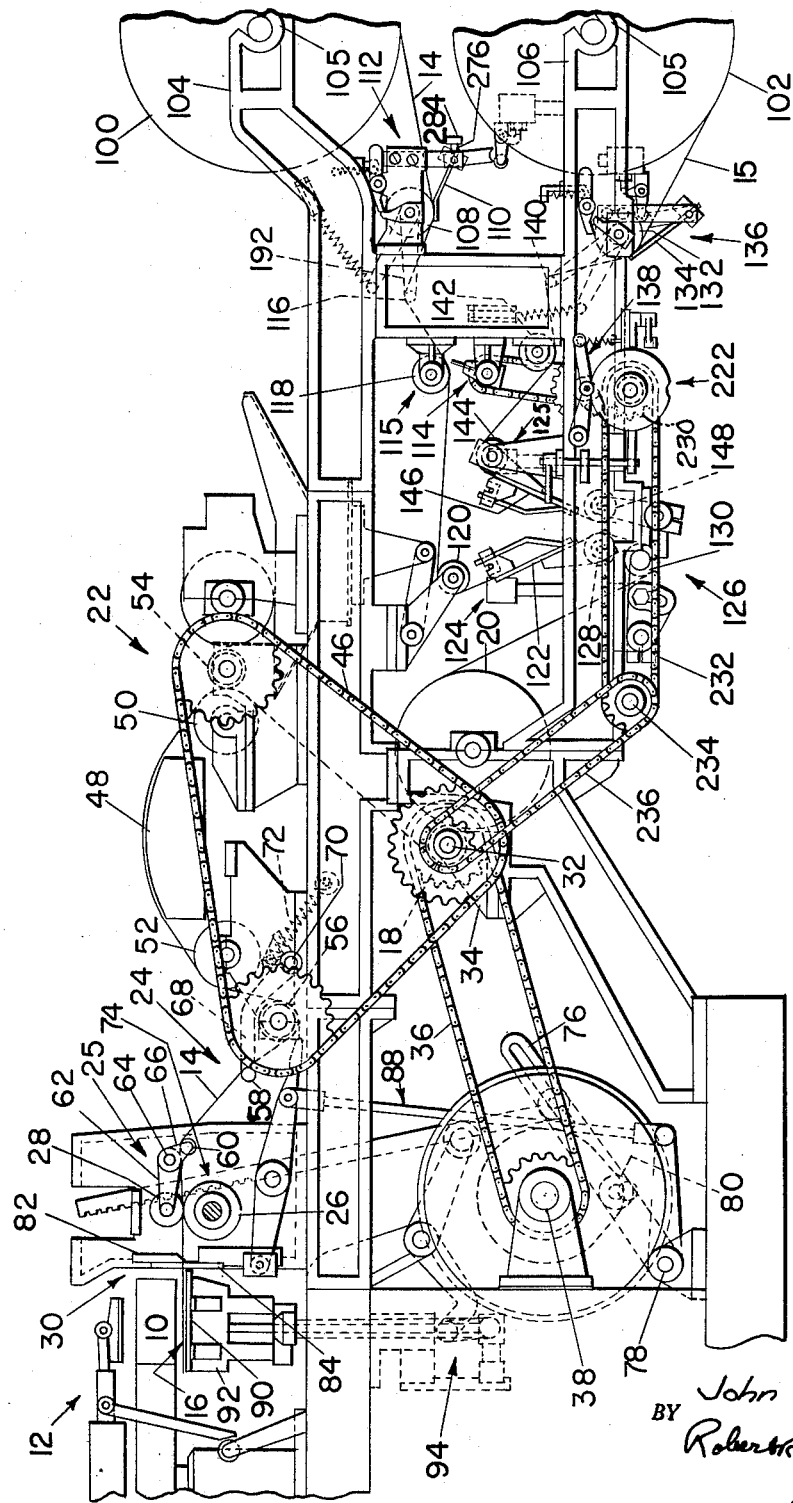
FIG. 1 is a side elevation of a container forming machine embodying the present invention.

In general the present invention contemplates novel web feeding and splicing apparatus adapted for feeding a web of flexible sheet material from a supply thereof and into operative position to be severed to form successive individual sheets or blanks of container forming material. The invention is herein illustrated as embodied in a container forming machine for forming a lined carton in which the sheet material is fed into operative position to be wrapped about a forming block to form a bag or inner liner for a package. Inasmuch as the details of such container forming machines are well known and of themselves constitute no part of the present invention, only sufficient portions of such machines are herein illustrated and described to enable the present invention to be understood.

The sheet material is preferably supplied in roll form, and in operation a web is continuously withdrawn from the supply roll at a rate such as to enable a predetermined length of the leading end thereof to be intermittently advanced into operative relation to the forming block whereupon the leading end of the web is severed to form an individual sheet of container forming material or lining blank, successive leading ends being severed to form successive lining blanks of predetermined lengths. In practice prior to the present invention, when the supply roll was depleted it was necessary to stop the container forming machine, mount a new supply roll in position and thread the leading end thereof through the various feed rolls, guide rolls, adhesive applying rolls and the intermittently operated feed rolls before again starting the machine. This operation consumed a considerable amount of time during which the machine was idle, and as a result the production time of the machine was curtailed. In some instances, in order to avoid the time consuming threading operation, the operator could anticipate the depletion of a supply roll, stop the machine while some of the web still remained thereon, and then replace the depleted roll with a new roll, manually splicing the leading end of the new web to the trailing end of the old web. This operation also necessitates stopping of the machine and, in addition, fails to control the position of the splice in the subsequently severed sheet relative to the ends of the sheet, as will hereinafter be described.

In accordance with the present invention provision is made for supporting two supply rolls of the sheet material, the web withdrawn from one supply roll being continuously adpanced to the container forming machine, and the leading end of the web extended from the second supply roll is arranged in operative relation to be spliced to the trailing end of the web withdrawn from the first supply roll when the latter is depleted. Provision is also made for detecting the passage of the trailing end of the first web, and splicing mechanism responsive to the detecting mechanism is actuated to effect the splicing operation during the continuous advance of the web. Thereafter, during continuous withdrawal of the web from the second supply roll, a new supply roll may be mounted, and the leading end of a web extended therefrom may likewise be arranged in operative relation to be spliced to the trailing end of the web withdrawn from the second supply roll, similar mechanism being provided for detecting the trailing end of the second web to actuate the splicing mechanism. Thus, in operation the container forming machine may be continuously operated at full production, the present automatic splicing mechanism eliminating the necessity of stopping the machine when a new supply roll is mounted to replace a depleted supply roll.

In practice when a lining blank is folded about a forming block to form a tube, extended portions thereof are folded and adhesively secured to provide a bottom closure for the lining bag. Thereafter, when the lined package produced on the container forming machine is removed from the forming block and filled, the mouth portions of the lining bag are similarly folded and adhesively secured to provide a top closure for the lining bag. In accordance with another feature of the present invention provision is made for assuring that the spliced portion of the web will occur in an intermediate position relative to the ends of the lining blank so that the subsequently formed bottom and top closures will be free of spliced portions which might otherwise interfere with efficient folding and sealing thereof. In general the mechanism for controlling the location of the splice relative to the ends of the lining blank comprises registering mechanism which includes means for detecting the trailing end of the web and means responsive thereto for cutting a portion of the trailing end, said means being correlated with the web feeding mechanism so that the subsequently formed splice will occur intermediate the length of the lining bag, as will be hereinafter more fully described.

Referring now to the drawings, 10 represents a forming block or mandrel forming a part of a container forming machine indicated generally at 12 having a plurality of such forming blocks which are arranged to be intermittently moved to the various lining and carton forming stations of the machine. In general in the operation of such machines, the leading end of a web 14 of sheet material is advanced into a position beneath a forming block 10 and severed to provide an individual lining blank 16; the lining blank is then folded about the forming block 10 to form a tube; and the longitudinal marginal edges of the blank are secured together to provide a side seam. At a succeeding station of operation portions of the tube extending beyond the end of the forming block are folded and sealed to provide a bottom closure for the lining bag. The adhesive for sealing the side seam and the bottom closure is preferably applied to the sheet material during the advance thereof and prior to advancing the sheet into operative relation to the forming block. At subsequent stations of the container forming machine an outer sheet or prescored carton blank may be wrapped about the lining bag carried by the block and provided with a bottom closure in a similar manner whereupon the lined carton may be stripped from the forming block ready to be filled and top sealed.

In the illustrated embodiment of the invention the web 14 is withdrawn from a supply roll thereof at a constant and uniform rate by web feeding mechanism including a continuously rotated feed roll 18 which cooperates with a backing roll 20. The web may then be advanced through adhesive applying mechanism, indicated generally at 22, through take-up mechanism 24, and between the rolls of an intermittently operated feeding mechanism 25 comprising a lower driven roll 26 and a plurality of upper presser rolls 28. The intermittently operated feeding mechanism 25 is arranged to advance a predetermined length of the leading end of the web each cycle of operation into operative relation to be wrapped about its forming block 10, successive lengths being severed from the web by intermittently operated shearing means indicated generally at 30.

Figure 2:
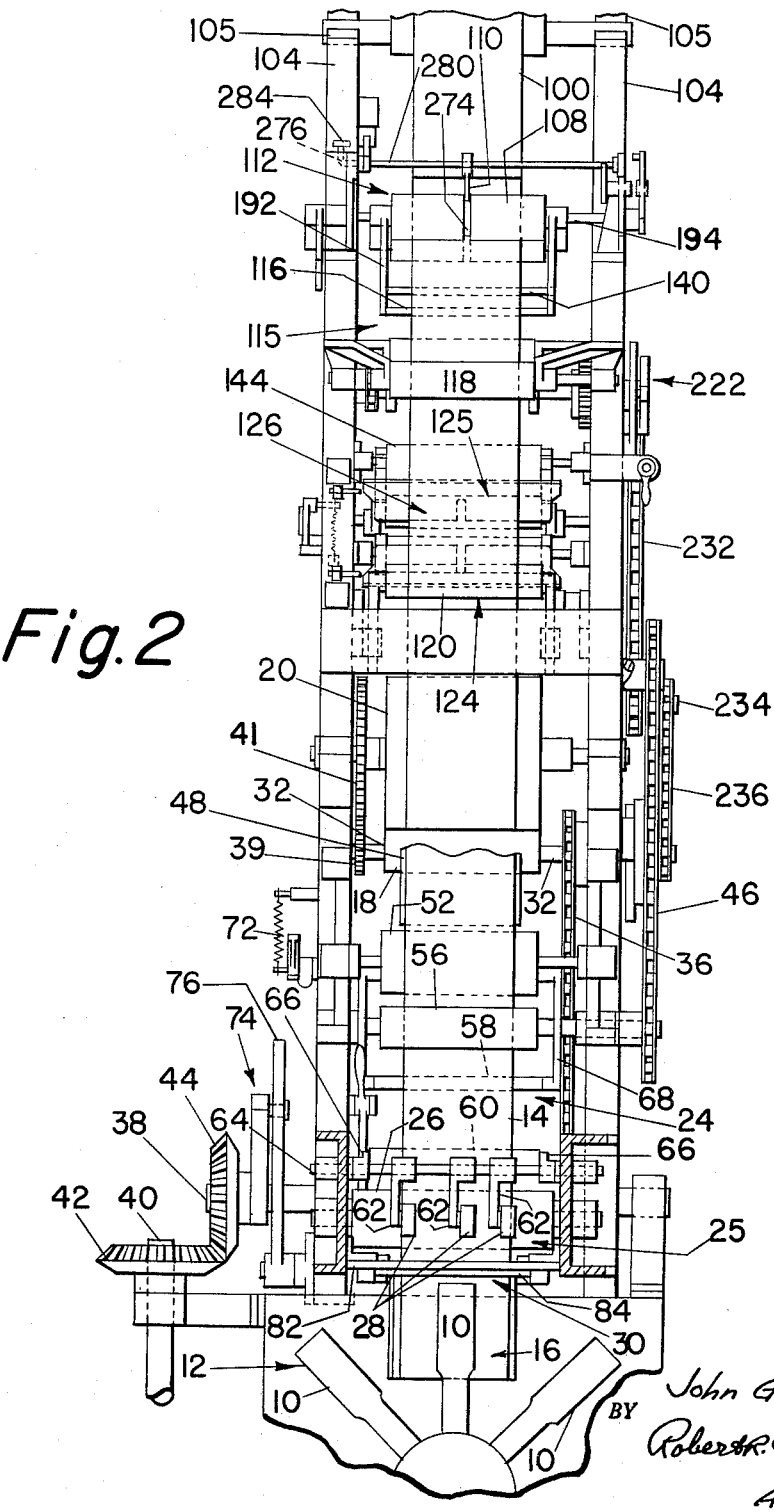
FIG. 2 is a plan view of the same.

The continuously rotated feed roll 18 is fast on a shaft 32 mounted in a bracket 34 secured to the machine frame and is arranged to be rotated by a chain and sprocket drive 36 from a cam shaft 38 forming a part of the container forming machine. As shown in FIG. 2, the cam shaft 38 is connected to a drive shaft 40 of the container forming machine through bevel gears 42, 44. The roll 20 may be connected to rotate with the roll 18 by spur gears 39, 41. The adhesive applying mechanism 22 may be driven from the shaft 32 through a chain and sprocket drive 46. In the illustrated embodiment of the invention the adhesive applying mechanism 22 is designed to apply strips of a hot melt adhesive to selected areas of the web, the web being subsequently passed over a curved chill plate 48 to stiffen the paper. Guide rolls 50, 52 are provided at each end of the chill plate, as shown, the roll 50 cooperating with the adhesive applying roll 54. The web is then passed under a guide roll 56 and then upwardly over a take-up guide roll 58 and over a guide roll 60 before passing between the intermittently operated feed roll 26 and its cooperating presser rolls 28. The presser rolls 28 are carried by arms 62 mounted on a rocker shaft 64 supported in the machine frame. Each roll 28 is preferably resiliently urged into engagement with the feed roll 26. Guide roll 60 is rotatably supported between arms 66 also fast on rocker shaft 64. The take-up roller 58 is carried by spaced curved arms 68 pivotally mounted at 70 and is urged to rock in a clockwise direction by springs 72 to take up the slack in the web between intermittent feeding operations of the feed roll 26. The feed roll 26 which forms a part of the container forming machine is arranged to be intermittently rotated from the cam shaft 38 through mechanism including a gear and rack connection 74, the rack being adjustably connected at one end to a slotted cam lever 76 pivotally mounted at 78. The lever 76 is provided with a cam roll 80 which cooperates with a cam fast on the cam shaft 38. The shearing mechanism 30 includes a stationary shear blade 82 and a cooperating movable blade 84 arranged to be vertically reciprocated through cam operated linkage indicated generally at 88. The severed sheet advanced into operative relation to be wrapped about the forming block 10 is supported on a horizontal plate 90 and is arranged to be folded about the block by mechanism including vertically reciprocable folding plates 92 also arranged to be actuated through cam operated linkage indicated generally at 94. In operation the forming blocks 10 may be heated, and where a hot melt glue is used the overlapping portions of the sheet wrapped about the block are pressed against the block to reactivate the previously applied adhesive strips to seal the side seam and bottom closure of the bag. When a liquid adhesive is used the heat of the block effects drying of the glue and bonding of the seam under pressure.

The feed roll 18 is rotated continuously one revolution per cycle and has a circumference equal to one blank length. The intermittently operated feed roll 26 is arranged to provide a small overfeed each cycle. In operation when the web is pulled taut between the feed rolls 18 and 26, a full blank length will be advanced, and the roll 26 will slip on the web during the overfeed at which time the web is severed. The glue roll 54 has the same speed and circumference as the roll 18 so that pulling the web taut each cycle assures correct spacing and registration of the adhesive strips to conform to successive severed lengths of the web.

In accordance with the present invention provision is made for mounting two supply rolls on the machine, herein shown as comprising an upper supply roll 100 and a lower supply roll 102 supported in upper and lower extensions 104, 106, respectively, of the machine frame and mounted for easy replacement in U-shaped slot bearings 105 provided therein. In practice a web may be continuously withdrawn from either the upper or lower supply roll and guided into operative relation to the registering mechanism which includes substantially similar upper and lower control mechanisms for detecting the trailing end of its respective web. The web then passes into operative relation to cutter mechanism, also forming a part of the registering mechanism, and which is responsive to either the upper or lower detecting mechanism for severing the trailing end of the continuously moving web in timed relation to the intermittent advance of the leading end for the purpose of assuring that the subsequently spliced portion of the web will occur in an intermediate position relative to the ends of the subsequently severed lining blank, as will be hereinafter more fully described. The web is then passed through either of similar left hand or right hand control mechanisms forming a part of the splicing mechanism and which includes means for detecting the severed trailing end. The web then passes into operative relation to the splicing mechanism responsive to either the left hand or right hand detecting mechanism for splicing the trailing end of one web to the leading end of the other web. As illustrated generally in FIG. 1, assuming that the web 14 is withdrawn from the upper supply roll 100, the web first passes between a grooved detecting roll 108 and a detecting finger 110 forming a part of the trailing end detecting mechanism for the upper web 14 and indicated generally at 112 for activating the registration cutter mechanism indicated generally at 115 and which includes a normally stationary upper rotary cutter indicated generally at 114. After passing between the roll 108 and the detecting finger 110 the web passes over a take-up roll 116 and under a guide roll 118 forming a part of the registration cutter mechanism 115, then over a guide roll 120 before passing downwardly over an inclined slotted supporting plate 122 forming a part of the left hand detecting mechanism 124 for actuating the splicing mechanism indicated generally at 126. After passing over the plate 122 the web 14 withdrawn from the upper supply roll 100 passes over a guide roll 128 forming a part of the splicing mechanism 126 and under an adjustable guide roll 130 before passing upwardly and over the roll 20 which cooperates with the continuously rotated feed roll 18. The web passes under the feed roll 18 and then upwardly into the adhesive applying mechanism 22 and then to the intermittently operated feeding mechanism 25, as described, whereby the leading end of the web is advanced into operative relation to the forming block 10 and severed to provide an individual lining blank.

During the operation of the machine the web 14 is continuously withdrawn from the upper supply roll 100 at a constant and uniform rate commensurate with the lengths intermittently advanced by the feeding mechanism 25. At any time during the continuous withdrawal of the web 14 from the upper roll 100 the leading end of the idle web 15 may be extended from the lower supply roll 102 and disposed in operative position to be spliced to the trailing end of the web 14 withdrawn from the upper supply roll. As shown in FIG. 1, the idle web 15 is extended between a similar detecting roll 132 and detecting finger 134 forming a part of the lower trailing and detecting mechanism 136 arranged to actuate the registration cutter mechanism 115 which also includes a normally stationary rotary cutter indicated generally at 138. After passing between the roll 132 and finger 134 the web 15 is directed over a take-up roller 140; under guide roll 142 forming a part of the cutter mechanism 115; over a guide roll 144 and then downwardly over a similar inclined and slotted supporting plate 146 forming a part of the right hand detecting mechanism 125 to present the leading end of the lower web in front of and in engagement with a splicing roller 148 which cooperates with the stationary roller 128 to perform the splicing operation. The leading end of the web 15 may be provided with a transverse band of pressure sensitive adhesive tape 150 having an exposed adhesive portion disposed to be pressed against and secured to the trailing end of the web 14 in response to the left hand detecting mechanism indicated generally at 124.

From the general description thus far it will be apparent that after a splice has been made between the trailing end of the web 14 withdrawn from the upper supply roll 100 and the leading end of the web 15 extended from the lower supply roll 102 the web 15 will pass under the adjustable guide roll 130 and upwardly to the feed rolls 18, 20, as previously described, and that the leading end of a new upper supply roll 100 may be threaded over the guide rolls and through the control mechanisms, as also previously described, to present its leading end in front of and in engagement with the stationary roller 128 in operative position to be spliced to the trailing end of the web 15 being withdrawn from the lower supply roll when the trailing end thereof is detected by the right hand detecting mechanism 125.

Figure 11:
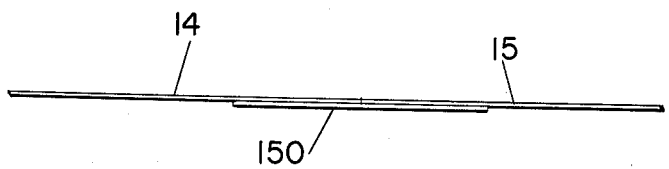
FIG. 11 is a detail view of the spliced ends of the webs.
Figure 8:
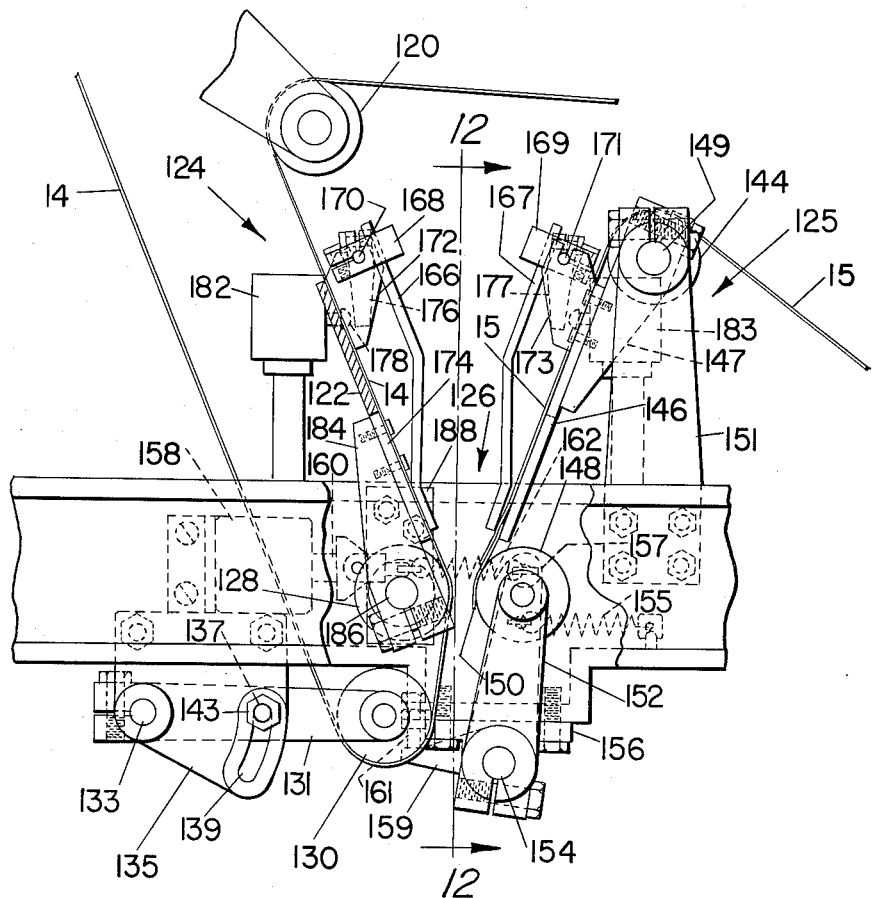
FIG. 8 is a side elevation of the splicing mechanism portions thereof being shown in cross section.
Figure 13:
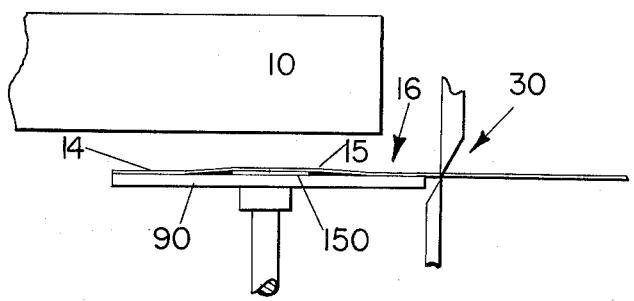
FIG. 13 is a side elevation showing the spliced portion of the leading end of the web advanced into registered position relative to the forming block.
Figure 9:
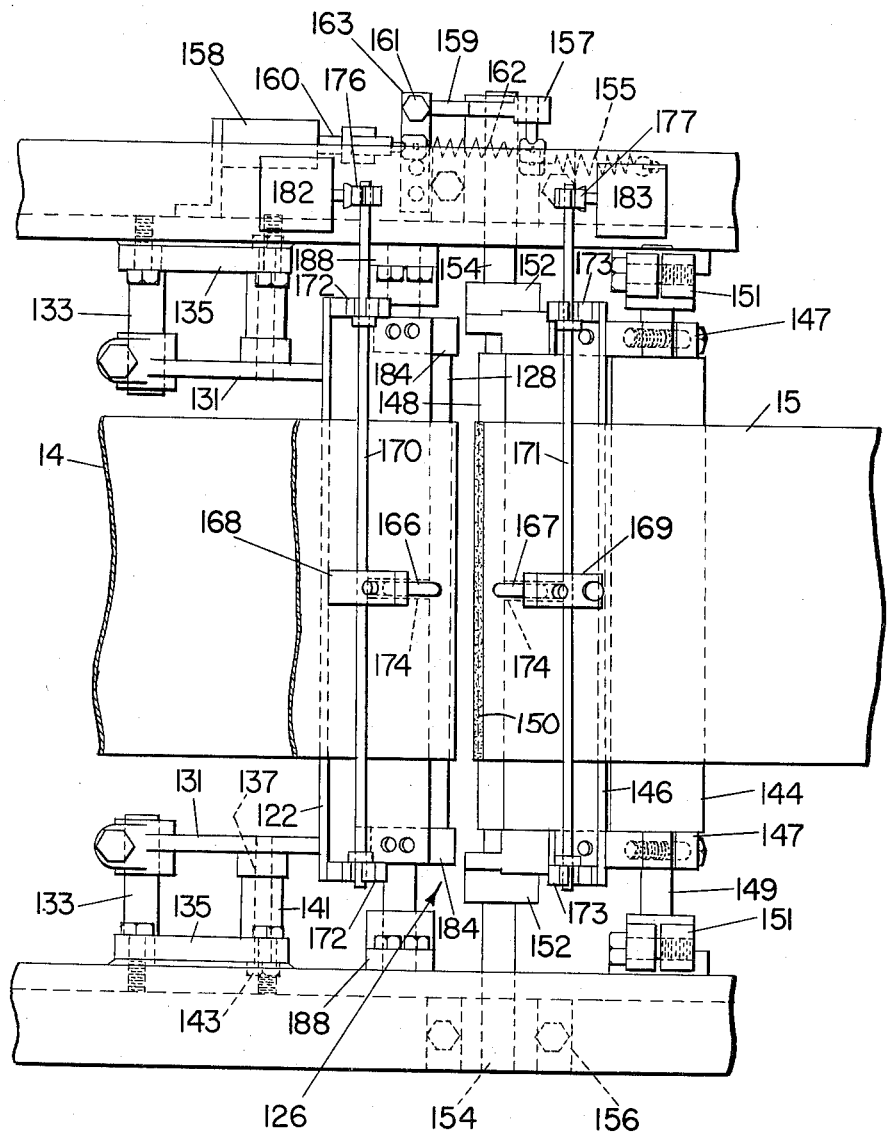
FIG. 9 is a plan view of the same.
Figure 10:
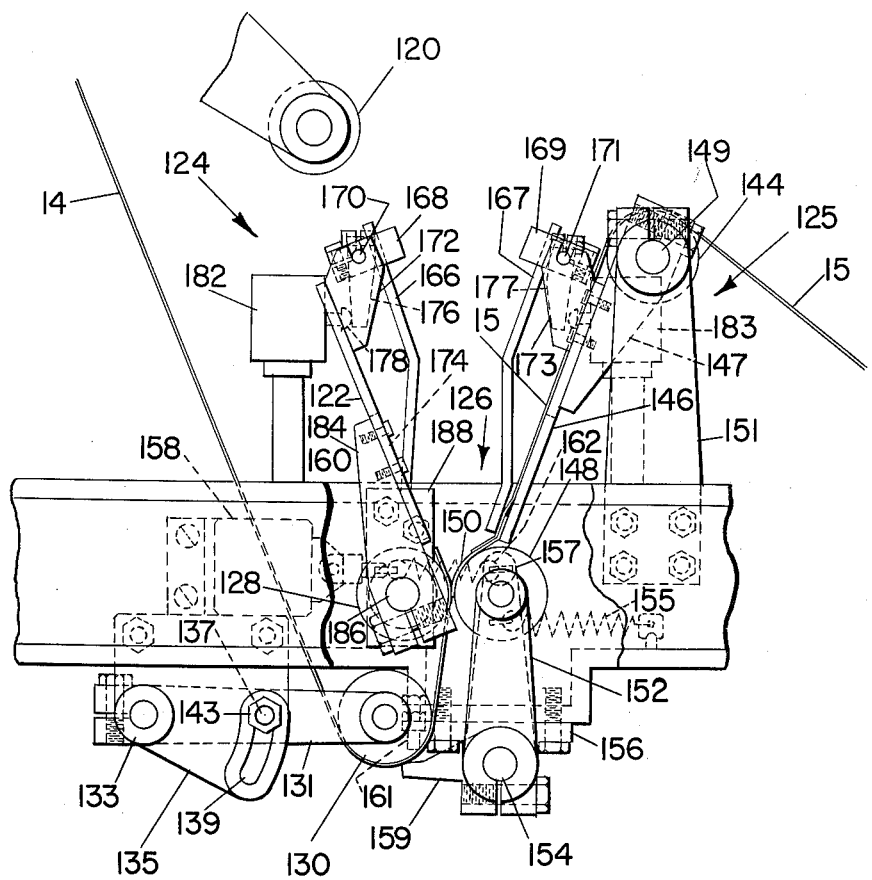
FIG. 10 is a view similar to FIG. 8 showing the parts in a different position of operation.
Figure 14:
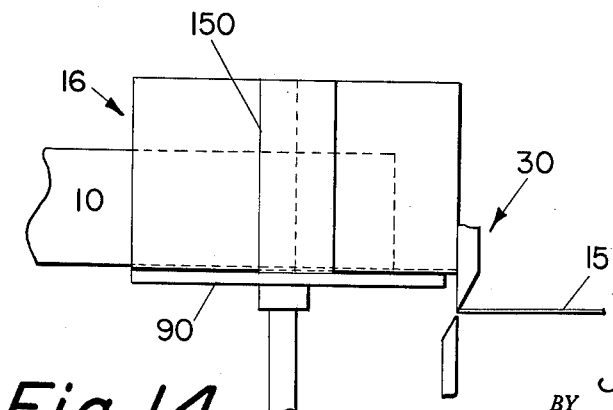
FIG. 14 is a similar view showing the severed sheet partially wrapped about the forming block.
Figure 12:
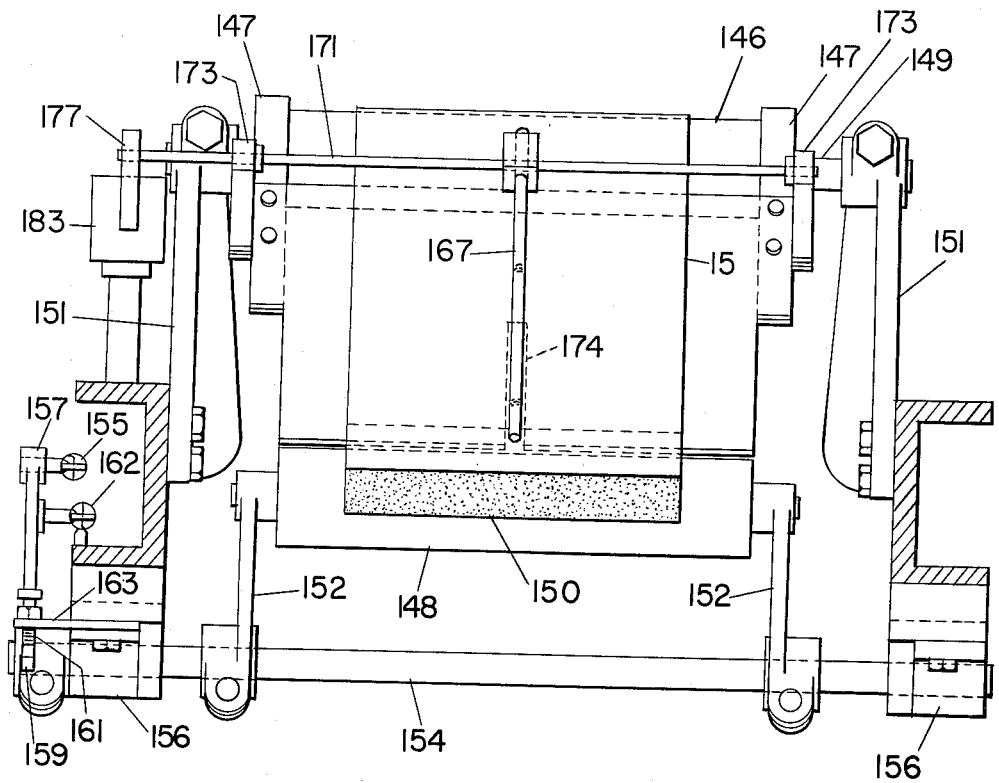
FIG. 12 is a vertical section taken on the line 12—12 of FIG. 8.

Referring now particularly to FIGS. 8, 9 and 12, the splicing mechanism 126 includes the roller 148 carried by spaced arms 152 fast on the shaft 154 mounted to rock in bearings formed in brackets 156 attached to the machine frame. The shaft 154 is normally urged in a clockwise direction by a spring 155 connected to an arm 157 also fast on the shaft 154 to dispose the splicing roll 148 in a position spaced from the cooperating roll 128 as shown in FIG. 8. A right angle extension 159 from the arm 157 is arranged to engage an adjustable stop screw 161 carried by an extension 163 from the frame to limit and adjust the spaced position of the roller 148 from the roll 128. The shaft 154 is arranged to be rocked in a counterclockwise direction into cooperating engagement with the roll 128 to effect the splicing operation by a solenoid 158 having an armature 160 connected by a spring 162 to the arm 157. The solenoid 158 is arranged to be energized in response to either of the substantiallly similar detecting mechanisms 124 or 125 for the web being withdrawn from the upper or lower supply roll respectively. As herein shown, the left hand detecting mechanism 124 for the web 14 includes a detecting finger 166 extended from an arm 168 clamped to a rod 170 rockingly mounted in U-shaped slots or bearings formed in brackets 172 extended from the slotted web supporting plate 122. The free end of the detecting finger 166 normally rests on the upper surface of the web 14, as shown in FIG. 8, and in alignment with the underlying slotted portion 174 of the plate 122. Thus, when the trailing end of the web 14 passes beyond the end of the finger 166, the latter will fall into the slot 174 to rock the rod 170 in a clockwise direction as shown in FIG. 10. In practice the rod 170 may be provided with a weighted member, not shown, to urge the finger into the slot. When this occurs a switch actuating arm 176 also clamped to the rod 170 engages a switch operating pin 178 to close the contacts of a normally open microswitch 182 forming a part of a circuit to the solenoid 158. As illustrated in FIG. 8, the web supporting plate 122 is attached to spaced arms 184 which are adjustably clamped to studs 186 secured to brackets 188 attached to the machine frame. Thus, in operation when the trailing end of the web 14 is detected the splicing roll 148 is rocked to present the leading end of the web 15 into adhesively secured engagement therewith by virtue of the pressure sensitive adhesive tape 150 previously applied to the leading end of the web 15. As illustrated in detail in FIG. 11, the ends of the web are preferably secured in abutting relation. This relationship may be accomplished by rotary adjustment of the relative position of the detecting finger 166 and the switch actuating arm 176 on the rocker rod 170, or by longitudinal adjustment of the detecting finger 166 in its arm 168 to effect operation of the splicing roll 148 in timed relation to the arrival of the trailing end of the web 14. In practice the leading end of the web provided with the splicing tape 150 may be disposed in a predetermined at rest position in front of its roll 128 or 148 for cooperation with the trailing end of the web. It will be observed that the splice is made by the pressure of the cooperating rolls 148, 128 during the continuous passage of the trailing end of the web 14 over the roll 128, and that the web 15 spliced thereto is pulled along therewith, the initial unwinding strain from the supply roll 102 being taken up by the take-up roll 140. It will also be observed that the splicing tape 150 connecting the leading end of the web 15 to the trailing end of the web 14 occurs on the underside of the subsequently severed sheet 16. In practice the detecting mechanism 124 may remain in its switch actuating position, and the roll 148 may remain in engagement with the roll 128 until the leading end of a new web 14 is threaded through the mechanism to effect opening of the switch 182 to deenergize the solenoid 158.

Thereafter when the supply roll 102 is depleted and the trailing end of the web 15 is detected by the right hand detecting mechanism indicated at 125, the splicing roll 148 will be actuated in a similar manner to press the trailing end of the web 15 against the leading end of the web 14 of a new supply roll 100 which has been threaded through the mechanism, as previously described, and the leading end thereof provided with a transverse strip 150 of pressure sensitive adhesive tape which is disposed in front of and in engagement with the roller 128. As herein shown, the detecting mechanism 125 for the web 15 includes a similar detecting finger 167 carried by an arm 169 clamped to the rod 171 and cooperating with a slotted plate 146. The rod 171 is mounted in brackets 173 and the finger 167 will be rocked in a counterclockwise direction when the trailing end of the web is detected to cause the arm 177 to close the switch 183 and energize the solenoid 158 to effect movement of the trailing end of the web 15 into adhesive engagement with the leading end of the new web 14 to form a butt joint. It will be observed that the supporting plate 146 is secured to spaced arms 147 clamped to a shaft 149 supported in brackets 151 attached to the machine frame. The initial unwinding strain from the new supply roll 100 is taken up by the take-up roll 116. It will be observed that the splicing tape 150 connecting the leading end of the web 14 to the trailing end of the web 15 occurs on the opposite or upper face of the subsequently severed sheet. In the completed container formed from the sheet it is immaterial whether the splicing tape occurs on the inner or outer face of the sheet.

Figure 3:
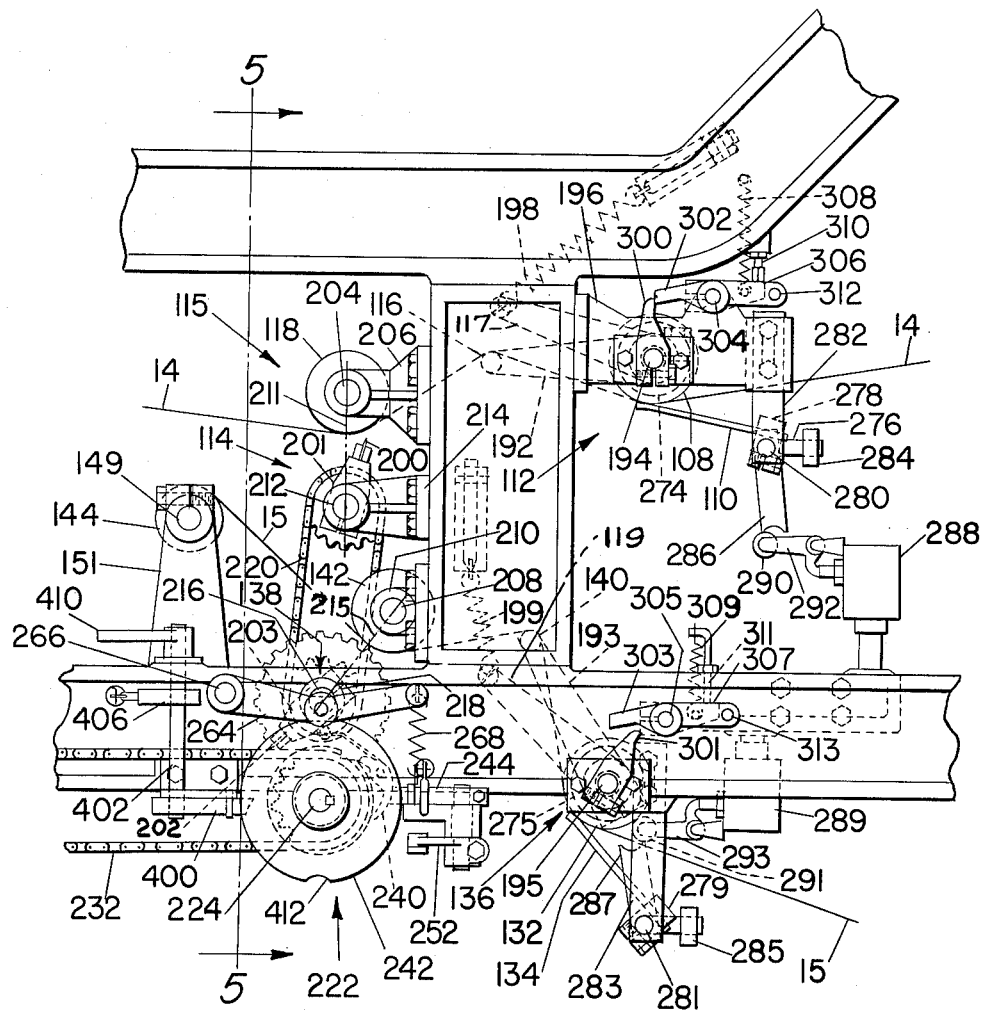
FIG. 3 is a side elevation at a larger scale of the registration cutting mechanism.

Thus, it will be seen that in operation while one supply roll is being advanced at a constant and uniform rate a second and idle supply roll may be mounted and arranged with its leading end in operative position to be spliced to the trailing end of the first roll when the trailing end thereof is detected, the same solenoid operated arm 152 being arranged to be actuated by either of the detecting mechanisms 124, 125. As shown in FIG. 3, the upper take-up roll 116 is carried between arms 192 mounted on rocker shaft 194 on which the detecting roller 108 is mounted. The shaft 194 is supported in brackets 196 attached to the machine frame, and a spring 198 connected to an arm 117 also fast on the shaft 194 is arranged to urge the arm in a clockwise direction as shown. The lower take-up roll 140 is similarly carried by spaced arms 193 mounted on a rocker shaft 195 on which the detecting roll 132 is mounted, and a spring 199 connected to an arm 119 also fast on the shaft 195 is arranged to urge the take-up arm in a clockwise direction. It will also be observed that the webs 14, 15 may be extended from either the upper or lower portion of its respective supply roll so that the unwinding rotation of the supply rolls may be either counterclockwise or clockwise. In the illustrated embodiment of the invention the webs are shown as being withdrawn from the lower portion or underside of their respective supply rolls.

Since the take-up mechanism for either web is only required to be active when a new roll is started after being spliced to the trailing end of a web from a preceding roll, provision is made for automatically latching the take-up mechanism in an inoperative position after the new roll is started. As illustrated in FIG. 3, the upper latching mechanism includes a latch arm 300 fast on the shaft 194 and a cooperating keeper 302 pivotally mounted on a shaft 304. A second arm 306 carried by the shaft 304 is provided with a spring 308 urging the keeper in a counterclockwise direction, the movement of the keeper being adjustably limited by a set screw 310 cooperating with the arm 306 to maintain the keeper in a position to cooperate with the latch arm 300. The lower latching mechanism comprises a similar latch arm 301 fast on the shaft 195 and a cooperating keeper 303 pivotally mounted on a shaft 305. The keeper 303 is also urged in a counterclockwise direction by a spring 309 connected to a second arm 307 which is limited in its movement by an adjustable set screw 311. A handle 312 is provided for the keeper 302 to enable the latch arm to be manually released, and a similar handle 313 is provided for the keeper 303 for manually releasing the latch arm 301 as required.

In operation, when the web 14 comprises the moving web and the web 15 comprises the idle web, the latch arm 301 is manually released as shown in FIG. 3. The upper latch arm 300 is in its latched position at this time. Thus, the take-up roll 140 and its arm 193 are urged in a clockwise direction by the spring 199 in a position to be rocked in a counterclockwise direction by the initial unwinding strain occurring when the leading end of the web 15 is spliced to the trailing end of the web 14. As a consequence of being rocked in a counterclockwise direction by the start of the new web 15, the latch arm 301 is automatically engaged with its keeper 303 to render the take-up arm 193 inoperative during the active run of the web 15. Thereafter, when a new roll 100 is mounted and threaded through the control mechanisms, as described, the latch arm 300 is manually released to dispose the take-up arm 192 and roller 116 in an operative position to take up the initial unwinding strain from the roll 100 when the leading end of the web 14 is subsequently spliced to the trailing end of the web 15, and at such time the latch arm 300 will be automatically latched in its inoperative position in a similar manner.

In accordance with another feature of the present invention provision is made for registering the splice between the leading and trailing ends of the webs with relation to the length of a severed sheet or lining blank 16 so that the splice will occur intermediate the ends thereof and spaced from the end portions which will subsequently be folded to provide top and bottom closures. This is accomplished by cutting the trailing end of the web, prior to the splicing operation, at a predetermined point in the continuously moving web such that the subsequently formed splice will occur in the severed blank at a point intermediate the ends thereof. It will be evident that a predetermined length of web extends between its supply roll and the sheet severing mechanism 30 immediately in front of the intermittently operated feeding mechanism 25, except that between feeding cycles of the intermittent feed, the take-up mechanism 24 takes up the slack equivalent to about one length of a sheet to be advanced to the severing mechanism 30 and onto the blank supporting plate 90 beneath the forming block 10. Thus, the cutting of the trailing end at a predetermined point in such extended length may be effected by operating the registration cutter mechanism 115 in timed relation to the advance of the web so that the extended length of the web between the sheet severing mechanism 30 and the trailing end cut will be equal to a multiple of the length of a sheet plus one half a sheet length.

As herein shown, the registration mechanism 115 includes the upper and lower rotary cutter units 114, 138, each unit including spaced arms 201, 203 provided with a cutter blade 200, 202, respectively. The upper cutter blade 200 is arranged to cooperate with the roll 118 to perform the cutting operation on the trailing end of the web 14. The roll 118 is rotatably mounted on a shaft 204 carried by brackets 206 attached to the machine frame. The lower cutter blade 202 is arranged to cooperate with the roll 142 to perform the cutting operation on the trailing end of the web 15. The roll 142 is rotatbly mounted on a shaft 208 carried by brackets 210 attached to the machine frame. The rotary cutters are normally stationary and are arranged to be rotated through one-half revolution in steps of two one-quarter revolutions, as will be hereinafter described, when actuated in response to either of the upper or lower detecting mechanisms 112, 136. The upper cutter arms 201 are fast on a shaft 212 journaled in brackets 214 attached to the machine frame; the lower cutter arms 203 are fast on a shaft 216 journaled in bearings 218; and the upper and lower shafts 212, 216 are connected to rotate together in a counterclockwise direction by a chain and sprocket drive 220. During the half revolution of both cutters in response to either of the detecting mechanisms 112, 133, only one cutter is effective to perform a cutting operation, the other cutter being rotated through an inoperative half revolution, the cutters being altternately effective to cut their respective webs 14, 15. Thus, when the web is being withdrawn from the upper supply roll 100 the cutter blade 200 carried by the rotary cutter arm 201 is disposed in a radial position about 15° to the right of a center line 211 passing through the shaft 212 and shaft 204. At this time the cutter blade 202 carried by the cutter arm 203 is disposed in a radial position advanced 180° relative to the position of the blade 200 with respect to a corresponding center line 215 passing through shaft 216 and shaft 208. Thus, in operation when the cutting mechanism is rotated through 180° in response to the detecting mechanism 112 the upper cutter blade 200 will pass through the center line 211 to effect cutting of the trailing end of the web 14 and come to rest 180° from its starting point, while the lower blade 202 will pass through an inoperative 180° revolution and come to rest in a radial position about 15° to the right of the center line 215 corresponding to the starting point of blade 200 during the previous cutting operation. Thus, the blade 202 is disposed in a position to sever the trailing end of the web 15 during the following half revolution of the cutter mechanism 115 in response to the detecting mechanism 136 while the blade 200 passes through an inoperative half revolution.

Figure 6:
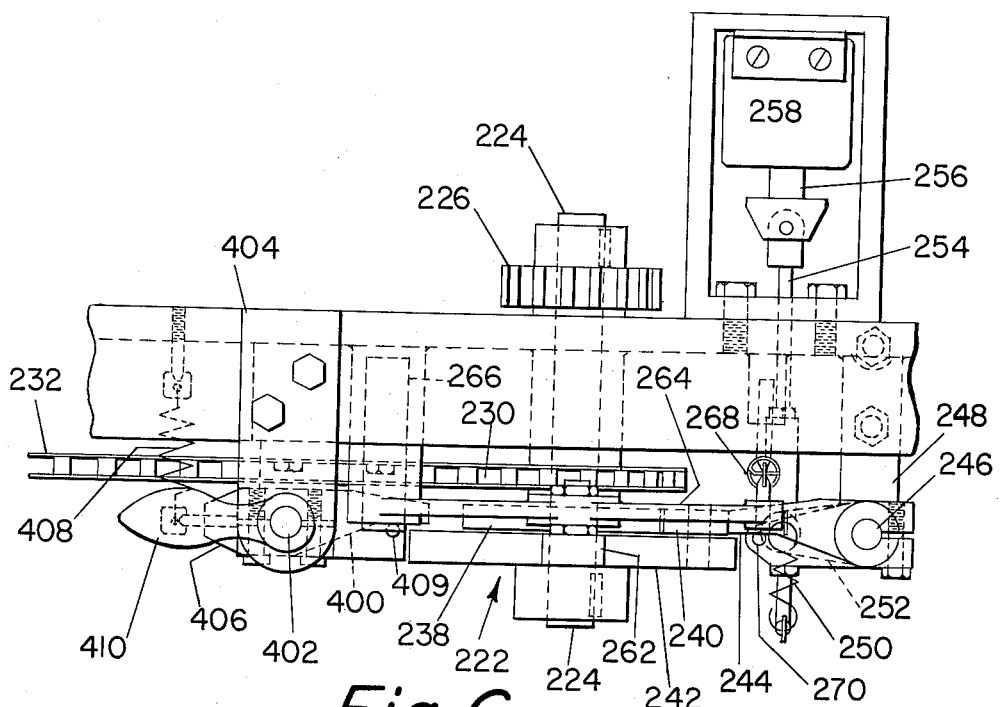
FIG. 6 is a detail view in plan elevation of a portion of the drives and control for the registration cutting mechanism.
Figure 7:
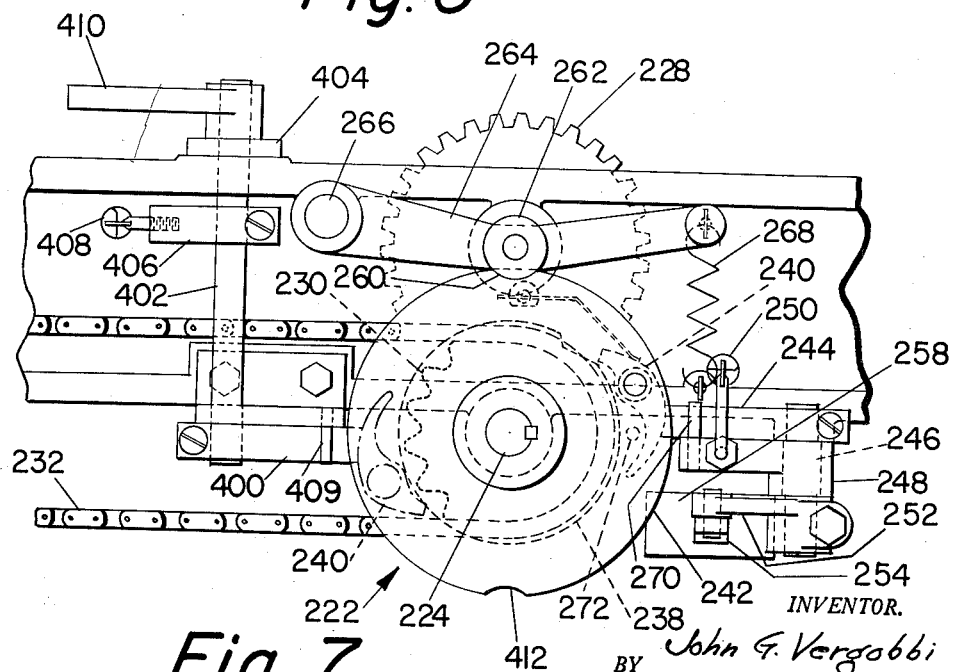
FIG. 7 is a front elevation of the same.

As illustrated in FIGS. 6 and 7, the drive to the severing mechanism 115 includes a one-revolution clutch indicated generally at 222 mounted on a shaft 224 journaled in a bearing formed in the machine frame. The one-revolution shaft 224 is connected to the lower cutter shaft 216 by spur gears 226, 228 having a ratio of 2 to 1 so that upon rotation of the shaft 224 through one revolution, the shaft 216 and the connected shaft 212 will be rotated one-half revolution. The driving member of the one-revolution clutch 222 includes a sprocket 230 mounted to rotate freely on the shaft 224 and is connected by a chain and sprocket drive 232 to an intermediate shaft 234 journaled in the machine frame. As shown in FIGS. 1 and 2, the intermediate shaft is connected by a chain and sprocket drive 236 to the drive shaft 32. Thus, the sprocket 230 is continuously rotated in timed relation to the continuous movement of the web being withdrawn from a supply roll.

The sprocket 230 comprising the driving member of the one-revolution clutch 222 has secured thereto a one-tooth ratchet 238 arranged to cooperate with a spring pressed pawl 240 pivotally mounted in a pawl carrier disk 242 keyed to the one-revolution shaft 224 and which forms the driven member of the one-revolution clutch. As shown in FIGS. 6 and 7, the pawl 240 is normally maintained in a disengaged position by a pawl stop 244 arranged to engage the tail of the pawl. The pawl stop is clamped to the upper end of a vertical stud 246 rockingly mounted in a bracket 248 attached to the machine frame. A coil spring 250 connected to the pawl stop is arranged to urge the same into the path of the pawl to effect disengagement thereof. The lower end of the rocker stud 246 is provided with an arm 252 fast thereon and which is connected by a link 254 to the armature 256 of a solenoid 258 secured to the machine frame. Thus, in operation when the scolenoid 258 is energized the pawl stop 244 will be withdrawn to permit engagement of the pawl with the tooth of the ratchet to make one revolution, the pawl stop 244 returning into the path of the pawl to disengage the same at the end of the revolution. In order to prevent backlash and to bring the one-revolution shaft to rest in a predetermined position, the carrier disk 242 is provided with a cutout portion 260 arranged to be engaged by a roll 262 carried by an arm 264 pivotally mounted at 266. A spring 268 connected to the arm 264 is arranged to urge the roll 262 into the cutout. A stop pin 270 extended upwardly from the bracket 248 is arranged to limit the rocking movement of the pawl stop in the direction to disengage the pawl. A stop pin 272 extended from the carrier disk likewise limits the movement of the pawl in its disengaged position.

While the registration cutter mechanism 115 must pass through successive one-half revolutions to perform the trailing end cutting operations on successive upper and lower webs 14 and 15, respectively, as described, in the illustrated embodiment of the invention it is preferred to operate the cutter mechanism through successive one-quarter revolutions for a purpose which will hereinafter appear. As shown in FIG. 7, a second pawl stop 400 is provided for the one-revolution clutch, the second pawl stop being spaced 180° from the first pawl stop 244 to bring the driven member 242 and the shaft 224 to rest at the end of one-half revolution. The second pawl stop 400 is manually operated and, as herein shown, the pawl stop 400 is fast on the lower end of a vertical rocker shaft 402 journaled in brackets 404 attached to the machine frame. An arm 406 also fast on the vertical shaft 402 is connected by a spring 408 arranged to urge the pawl stop 400 into the path of the pawl 240 and against a stop pin 409. A handle 410 is provided at the upper end of the shaft 402 to effect manual rocking of the pawl stop out of the path of the pawl whereby to permit engagement of the one-revolution clutch to rotate through a second half revolution before being engaged by the solenoid operated pawl stop 244 to bring the shaft 224 to rest. A second cutout portion 412 formed in the periphery of the carrier disk 242 is provided to cooperate with the spring actuated roller 262 to bring the shaft 224 to rest in its half revolution position. It will be seen that successive one-half revolutions of the shaft 224 will drive the registration cutter mechanism 115 through successive one-quarter revolutions by virtue of the 2 to 1 drive connections.

Figure 4:
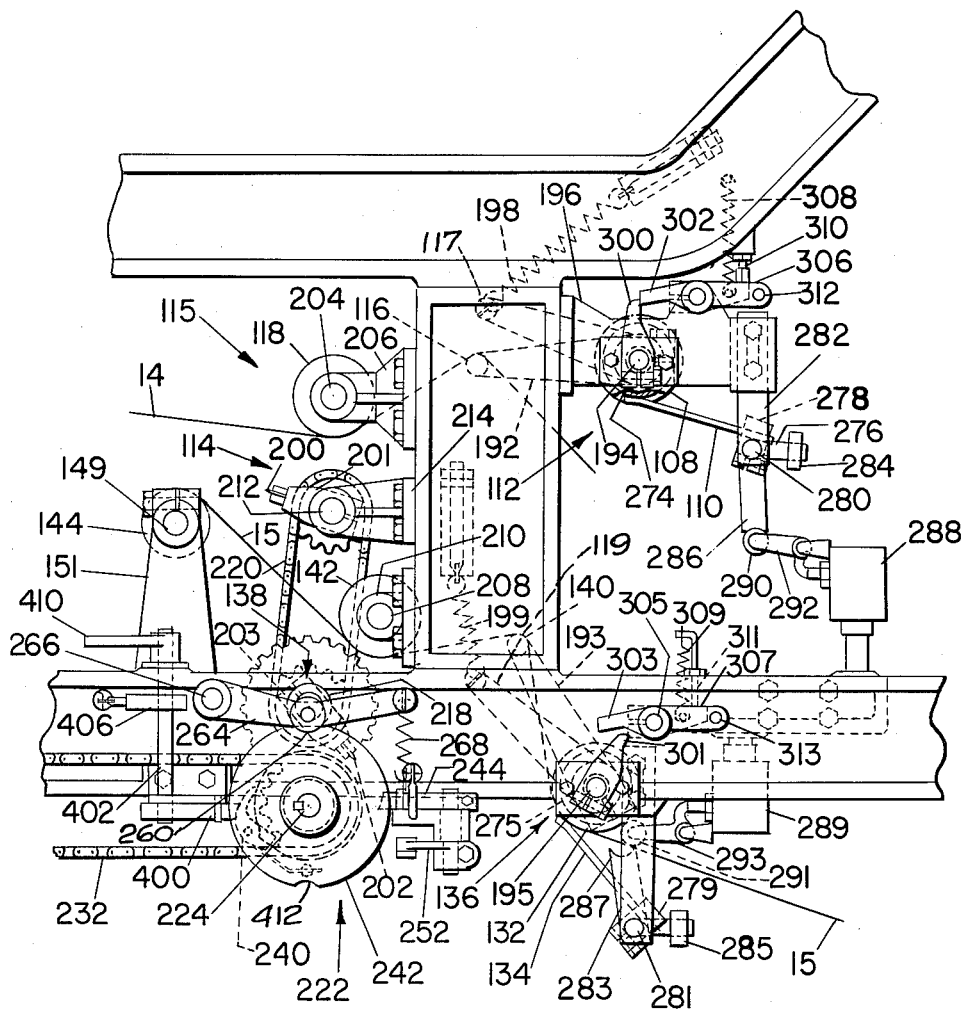
FIG. 4 is a similar view showing the mechanism in a different position of operation.
Figure 5:
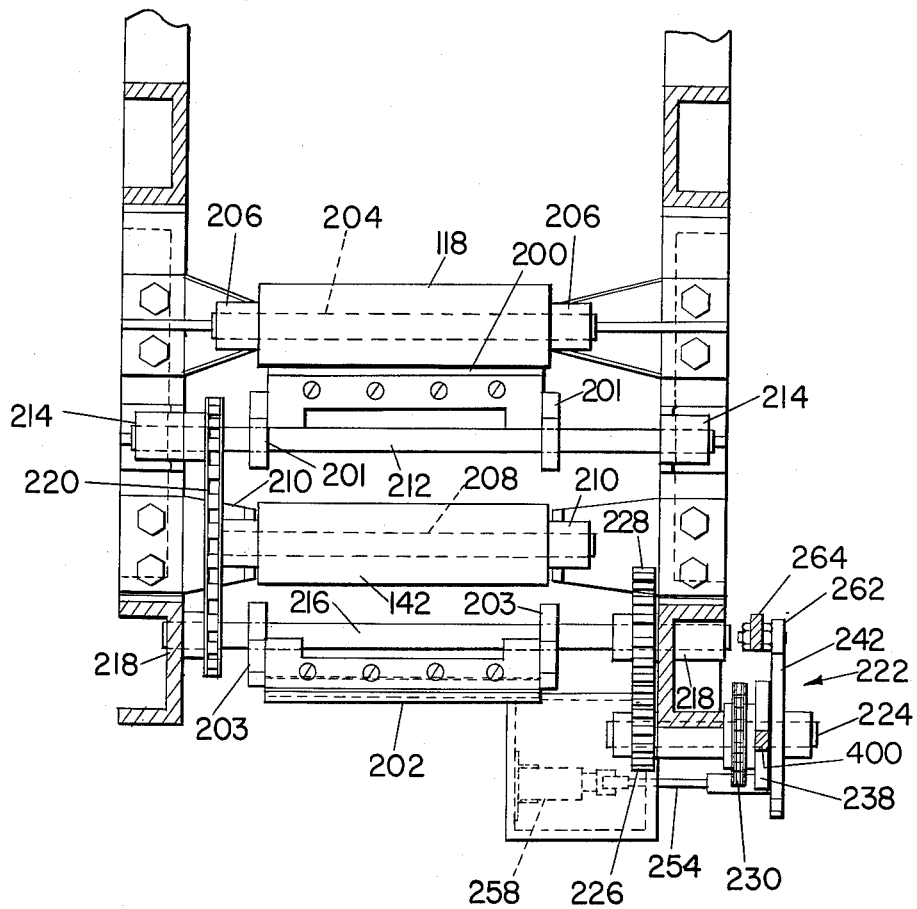
FIG. 5 is a vertical cross sectional view taken on the line 5—5 of FIG. 3.

In operation when either one or the other of the detecting mechanisms 112, 136 actuate the solenoid 258 to withdraw the pawl stop 244 the second pawl stop 400 will bring the shaft 224 to rest after traveling through 180°. At this time, assuming that the cutter blade 200 is initially in the position shown in FIG. 3, the shaft 212 will travel through 90° to effect cutting of the trailing end of the web 14 and to present the cutter 200 in the position shown in FIG. 4. During this time the cutter blade 202 will also have traveled through a corresponding distance to come to rest in the position shown in FIG. 4. While the cutter units 114, 138 are thus at rest, the severed web 14 will continue its advance through the splicing mechanism to be spliced to the leading end of the web 15. A new roll 100 may now be mounted and the web 14 extended therefrom may be threaded between the roll 108 and finger 110 of the detecting mechanism 112 to render the same inactive and to deenergize the solenoid 258, the new web 14 being extended through the remaining control mechanisms, as described, to present the leading end thereof in operative relation to be spliced to the trailing end of the web 15. It will thus be seen that the second pawl stop 400 serves as a safety device to retain the cutters at rest in an intermediate position during the mounting and rethreading of the web of a new roll into the machine and prevents inadvertent rotation of the cutters during this time so that the operator is able to thread the web with safety. After the new roll has been mounted and the web therefrom threaded through the mechanisms, as described, the manually operated pawl stop 400 may be rocked out of the path of the pawl 240. At this time the solenoid 258 has been deenergized and the pawl stop 244 moved back into the path of the pawl 240 so that the shaft 224 will come to rest after passing through the second 180° of its revolution. Accordingly, the cutter blades 200, 202 will be correspondingly rotated through the second 90° of their 180° travel to present the blade 202 in a position such that during a succeeding cycle of the cutter mechanism it will effect cutting of the trailing end of the web 15. As above stated, the cut is made in timed relation to the advance of the continuously moving web and at a predetermined point in the web with relation to its length from the severing mechanism 30 to the trailing end cut which is equal to a multiple of the length of a severed sheet plus the length of one-half a sheet to present the subsequently spliced portion in an intermediate position in the severed sheet in which it occurs. In order to adjustably control such predetermined length between the sheet severing mechanism and the trailing end cutter mechanism provision is made for adjusting the guide roll 130 to increase or decrease such length whereby to assure registration of the spliced portion in an intermediate position as described. As illustrated in FIGS. 8 and 9, the guide roll 130 under which the web passes before being extended between the feed rolls 18, 20 is carried between spaced arms 131 which are clamped to similar studs 133 extended from brackets 135 attached to the machine frame. Each arm 131 is provided with a stud 137 extended through a slotted portion 139 of its bracket. A sleeve 141 is interposed between each arm and its bracket and the outer end of each stud is threaded for cooperation with a nut 143 to clamp the arms in their adjusted position.

As illustrated in FIG. 3, the upper trailing end detecting mechanism 112 includes the roll and detecting finger 108, 110 between which the web 14 passes as it is withdrawn from the supply roll 100. The roll 108 is mounted to rotate on the shaft 194 and is provided with a peripheral groove 274 intermediate the ends thereof. The finger 110 is carried by an arm 278 clamped to a rocker shaft 280 supported in a vertically adjustable bracket 282. A counterweight 284 carried by a right angle bent end portion 276 of the shaft 280 is arranged to urge the detecting finger 110 into engagement with the web 14 passing under the roll 108, the finger 110 being arranged in alignment with the groove 274 as shown in FIG. 2. Thus, in operation when the trailing end of the web passes beyond the roll 108, the detecting finger 110 is permitted to rock in a clockwise direction. When this occurs a switch actuating arm 286 also fast on the rocker shaft 280 is rocked in a clockwise direction to actuate a microswitch 288 forming a part of the circuit to the solenoid 258. As herein shown, the end of the switch actuating arm 286 is concave, and normally one edge of the arm engages a roll 290 carried by the switch arm 292 to maintain the normally closed switch in an open position. When the switch actuating arm 286 is rocked in a clockwise direction the roll 290 enters the concave portion and the microswitch is permitted to close to energize the solenoid 258 and to effect the cutting operation on the trailing end of the web 14.

The lower trailing end detecting mechanism 136 is of similar structure and mode of operation, herein shown as including the roll 132 provided with an intermediate groove 275 and the finger 134 arranged to fall into the groove when the trailing end of the web 15 travels beyond the finger. The finger is carried by an arm 279 clamped to a rocker shaft 281 supported in a vertically adjustable bracket 283. A counterweight 285 is similarly carried by the shaft 281 and is arranged to urge the finger 134 into the groove 275 when the trailing end of the web passes beyond the roll 132. The actuating arm 287 also has a concave end portion, one edge of which engages the roll 291 of the switch arm 293 to maintain the normally closed switch 289 in an open position, and clockwise rotation of the arm 287 operates the switch to energize the solenoid 258 to effect the cutting operation on the trailing end of the web 15. It will be understood that the one tooth-ratchet 238 which is continuously rotated in timed relation to the continuous advance of the web determines the time of starting rotation of the one-revolution clutch, irrespective of the time when the trailing end is detected and the pawl stop 244 removed, so that the cut is made at a predetermined time in the cycle of advance of the web whereby to effect registration of the subsequently formed splice intermediate the ends of a subsequently severed sheet as described.

From the above description it will be seen that the present web feeding and splicing mechanism is capable of automatically splicing the leading end of a web extended from one supply roll to the trailing end of a web withdrawn from another supply roll during the continuous advance of the first web. It will be observed that both supply rolls in the present apparatus are mounted in a fixed position relative to the feeding and splicing mechanism as distinguished from apparatus wherein a newly mounted supply roll is moved into the position occupied by the depleted supply roll after being spliced. It will also be seen that the present apparatus is provided with registering mechanism capable of controlling the position of the spliced portion in a subsequently severed sheet whereby to dispose the spliced portion intermediate the ends thereof.

Wherever reference is made herein to the predetermined or adjusted length of the web between the cutter for severing the trailing end of the web and the shear blade for severing successive blanks as being equal to a multiple of the length of a severed sheet plus the length of one-half sheet, it will be understood that it is intended to include other fractions of the length of a sheet, such as plus one-quarter or plus three-quarters of a sheet, to dispose the splice at different positions intermediate the ends of the severed sheet.

While the preferred embodiment of the invention has been herein illustrated and described, it will be understood that the invention may be embodied in other forms within the scope of the following claims.

Having thus described the invention, what is claimed is:

1. Web feeding and splicing apparatus comprising, in combination, means for continuously advancing a web of sheet material, means for intermittently advancing and severing the leading end of said web to produce successive predetermined lengths, means for cutting the trailing end of said web, means for thereafter splicing the trailing end of said cut web to the leading end of a second web, and means for controlling the position of said cut including means to effect the cutting of the web at a predetermined time in the cycle of advance of the web whereby to effect registration of the subsequently formed splice intermediate the ends of a subsequently severed length of sheet material.

2. Web feeding and splicing apparatus as defined in claim 1 wherein the extended length of the continuously advanced sheet between the sheet severing means and the end cutting means at the time of the cut is related to a multiple of the length of a severed sheet.

3. Web feeding and splicing apparatus as defined in claim 1 which includes means for adjustably increasing or decreasing the length of the continuously advanced web whereby to vary the position of the splice in the severed sheet.

4. Web feeding and splicing apparatus comprising, in combination, means for continuously advancing at a predetermined cyclical rate a web of sheet material, means for cutting the trailing end of said web preparatory to a splicing operation, means for thereafter splicing the trailing end of said web to the leading end of a second web during the continuous advance of the web, and means for controlling the position of said cut relative to the rate of advance of the web, said control means including means for detecting the passage of the uncut trailing end, and cutter operating means responsive to said detecting means and cyclically operated in timed relation to the cyclical rate of advance of the web whereby to effect cutting of said trailing end at a predetermined time in the advancing cycle irrespective of the time of detection of said trailing end.

5. Web feeding and splicing apparatus comprising, in combination, means for continuously advancing a web of sheet material at a predetermined cyclical rate of advance, means for intermittently advancing and severing the leading end of said web to produce successive predetermined lengths, means for splicing a previously cut trailing end of said web to the leading end of a second web, and means for controlling the position of said splice in the web relative to the ends of a subsequently severed sheet containing the splice, said control means including means for detecting the passage of the uncut trailing end of said first web, and cutter means responsive to said detecting means and cyclically operated in timed relation to the continuous cyclical rate of advance of the web to effect cutting of said trailing end prior to the splicing operation at a point in the web related to the length of a severed sheet so as to register the splice intermediate the ends of said subsequently severed sheet.

6. Web feeding and splicing apparatus comprising, in combination, means for intermittently advancing and severing successive predetermined lengths of sheet material from a web thereof, means for continuously advancing said web at a predetermined cyclical rate of advance in timed relation to said intermittent advancing and severing means, means for splicing a previously cut trailing end of said web to the leading end of a second web during the continuous advance of the first web, and means for controlling the position of said splice in the web to effect registration of the same intermediate the ends of a severed sheet, said registration means comprising means for detecting the uncut trailing end of said first web, and cutter means responsive to said detecting means and cyclically driven in timed relation to the continuous cyclical rate of advance of the web to effect cutting of said uncut trailing end prior to the splicing operation in a position such that the length of the web extended between the cutter and said sheet severing means is equal to a multiple of the length of a sheet plus about one half a sheet length.

7. Web feeding and splicing apparatus as defined in claim 6 wherein provision is made for adjustably varying said extended length.

8. Web feeding and splicing apparatus comprising, in combination, means for intermittently advancing and severing successive predetermined lengths of sheet material from a web thereof, means for continuously advancing said web in timed relation to said intermittent advancing and severing means, means for splicing the trailing end of said web to the leading end of a second web, and means for controlling the position of said splice in the web to effect registration of the same intermediate the ends of a severed sheet, said registration means comprising means for detecting the trailing end of said first web, and cutter means responsive to said detecting means and driven in timed relation to the advance of the web to effect cutting of said trailing end prior to the splicing operation in a position such that the extended length of the web between the cutter and said sheet severing means is equal to a multiple of the length of a sheet plus one half a sheet length, a second detecting means for detecting the trailing end of said second web, a second cutter means operatively connected to said first cutter means and also responsive to said second detecting means, said first and second cutter means being operative alternately to cut the trailing ends of their respective webs.

9. Web feeding and splicing apparatus as defined in claim 8 wherein resilient take-up means is provided to take up the slack in the web between intermittent advancing and severing operations.

10. Web feeding and splicing apparatus as defined in claim 8 wherein the driving means for said cutters includes a one-revolution clutch operatively connected to said web advancing means and rendered operative by one or the other of said detecting means.

11. Web feeding and splicing apparatus as defined in claim 10 wherein the one-revolution clutch comprises a pawl and ratchet drive having a continuously rotated one-tooth ratchet driven in timed relation to the continuous advance of the web whereby the drive is engaged to sever the trailing end of the web at a point related to the length of a severed sheet.

12. Web feeding and splicing apparatus as defined in claim 8 wherein the driving means for said cutters includes a one-revolution clutch operatively connected to said web advancing means and rendered operative by one or the other of said detecting means, one revolution of said clutch effecting movement of one cutter through an operative cycle to effect cutting of its web and to come to rest in an inoperative position while the second cutter is moved through an inoperative cycle to present the same in operative position to effect cutting of its web during the succeeding cycle.

13. Web feeding and splicing apparatus as defined in claim 10 wherein the cutters comprise rotary cutters and wherein the one-revolution clutch is connected in a ratio of two to one to effect one-half revolution of the cutters during each cycle of operation.

14. Web feeding and splicing apparatus as defined in claim 13 which includes means for temporarily disengaging said one-revolution clutch after one-half revolution to dispose both of said cutters in an inoperative position to permit rethreading of a new supply roll into operative position to be spliced whereupon the clutch may be again engaged to permit the cutters to be advanced through the remainder of their cycle.

15. Web feeding and splicing apparatus as defined in claim 14 wherein the means for temporarily disengaging said one-revolution clutch includes a manually operated pawl stop.

16. Web feeding and splicing apparatus comprising, in combination, means for continuously advancing at a predetermined rate a web of sheet material unwound from a first supply roll, means for detecting the trailing end of the web completely unwound from said first roll, means responsive thereto for automatically splicing in abutting relation the leading end of a web extended from a second supply roll to the trailing end of said first supply roll while maintaining said predetermined rate of advance, and a second detecting means for detecting the trailing end of the web completely unwound from said second roll also operative to actuate said splicing means to automatically splice in abutting relation the trailing end of the second roll to the leading end of a new web extended from a supply roll replacing said first roll while maintaining said predetermined rate of advance.

17. Web feeding and splicing apparatus as defined in claim 16 wherein the supply rolls are mounted in fixed spaced apart positions and remain in their initially mounted positions during the entire unwinding operation.

18. Web feeding and splicing apparatus comprising, in combination, means for continuously advancing at a predetermined rate a web of sheet material unwound from a first supply roll, means for detecting the trailing end of said first roll, means responsive thereto for automatically splicing the leading end of a web extended from a second supply roll to the trailing end of said first supply roll while maintaining said predetermined rate of advance, a second detecting means for detecting the trailing end of said second roll also operative to actuate said splicing means to automatically splice the trailing end of the second roll to the leading end of a new web extended from a supply roll replacing said first roll while maintaining said predetermined rate of advance, and resilient tensioning means for each supply roll arranged to take up the initial unwinding strain of its respective supply roll, said tensioning means being operative only during the initial unwinding movement of the new web from its supply roll, and means responsive to the initial unwinding strain for locking the tensioning means in an inoperative position.

19. Web feeding and splicing apparatus comprising, in combination, means for continuously advancing at a predetermined rate a web of sheet material unwound from a first supply roll, means for detecting the trailing end of said first roll, means responsive thereto for automatically splicing the leading end of a web extended from a second supply roll to the trailing end of said first supply roll while maintaining said predetermined rate of advance, a second detecting means for detecting the trailing end of said second roll also operative to actuate said splicing means to splice the trailing end of the second roll to the leading end of a new web extended from a supply roll replacing said first roll while maintaining said predetermined rate of advance, resilient tensioning means for each supply roll arranged to take up the initial unwinding strain of its respective supply roll, said tensioning means being operative only during the initial unwinding movement of the new web from its supply roll, latch means cooperating with each tensioning means and automatically actuated by said initial unwinding strain to render its tensioning means inoperative during the remainder of the unwinding operation, and means for resetting said latch means to again render the tensioning means operative when a new supply roll is mounted.

20. Web feeding and splicing apparatus comprising, in combination, means for continuously advancing at a predetermined rate a first web of sheet material, means for detecting the trailing end of said first web, means responsive to said detecting means for cutting said trailing end preparatory to the splicing operation, means for detecting the trailing end of the cut web, and means responsive thereto for automatically splicing in abutting relation the leading end of a second web to the trailing end of said first web while maintaining said predetermined rate of advance, the leading end of said second web having a strip of pressure sensitive adhesive secured thereto with a portion exposed to be adhered to the first web, said splicing means including a stationary roll over which said first web passes and a movable roll normally spaced from said first roll and against which the leading end of said second web is supported to be moved into spliced engagement with the trailing end of the first web.

21. Web feeding and splicing comprising, in combination, means for continuously advancing at a predetermined rate a first web of sheet material, means for detecting the trailing end of said first web, means responsive to said detecting means for cutting said trailing end preparatory to the splicing operation, means for detecting the trailing end of the cut web, and means responsive thereto for splicing in abutting relation the leading end of a second web to the trailing end of said first web while maintaining said predetermined rate of advance, the leading end of said second web having a strip of pressure sensitive adhesive secured thereto with a portion exposed to be adhered to the first web, said splicing means including a stationary roll over which said first web passes and a movable roll normally spaced from said first roll and against which the leading end of said second web is supported to be moved into spliced engagement with the trailing end of the first web, said second web passing over the movable roller after the splicing operation, a second detecting means for detecting the trailing end of said second web, a second cutter means responsive to said second detecting means for cutting the trailing end of said second web preparatory to the splicing operation, a second means for detecting the trailing end of the second cut web and also operative to actuate said splicing means to move said second trailing end into adhering engagement with the leading end of a new web replacing said first web while maintaining said predetermined rate of advance, said new web also having a pressure sensitive strip secured thereto and disposed against said stationary roll.

22. Web feeding and splicing apparatus comprising, in combination, means for continuously advancing at a predetermined rate a first web of sheet material, means for detecting the trailing end of said first web, means responsive to said detecting means for cutting said trailing end preparatory to the splicing operation, means for detecting the trailing end of the cut web, and means responsive thereto for splicing in abutting relation the leading end of a second web to the trailing end of said first web while maintaining said predetermined rate of advance, the leading end of said second web having a strip of pressure sensitive adhesive tape secured thereto with a portion exposed to be adhered to the first web, said splicing means including a stationary roll over which said first web passes and a movable roll normally spaced from said first roll and against which the leading end of said second web is supported to be moved into spliced engagement with the trailing end of the first web during the continuous advance of the web, said second web passing over the movable roller after the splicing operation, a second detecting means for detecting the trailing end of said second web, a second cutter means responsive to said second detecting means for cutting the trailing end of said second web preparatory to the splicing operation, a second means for detecting the trailing end of the second cut web and also operative to actuate said splicing means to move said second trailing end into adhering engagement with the leading end of a new web replacing said first web while maintaining said predetermined rate of advance, said new web also having a pressure sensitive strip secured thereto and disposed against said stationary roll, each of said cut end detecting means including a detecting finger bearing against the moving web and arranged to be rocked upon passage of the trailing end thereof to actuate said splicing means, and means for adjusting said detecting means to vary the timing of the operation of said splicing means relative to the passage of a trailing end to enable a butt joint to be obtained.

23. Web feeding and splicing as defined in claim 22 wherein the movable splicing roll is solenoid operated and wherein the detecting means includes a switch in the solenoid circuit arranged to be closed by movement of the detecting finger to effect said splicing operation.

References Cited in the file of this patent

UNITED STATES PATENTS

| | | |
|---|---|---|
| 2,006,072 | Ferris | June 25, 1935 |
| 2,613,042 | Dice | Oct. 7, 1952 |
| 2,706,515 | Evers | Apr. 19, 1955 |
| 2,766,811 | Armelin et al. | Oct. 16, 1956 |
| 2,772,055 | Klingelfuss | Nov. 27, 1956 |
| 2,930,427 | Fillman et al. | Apr. 12, 1960 |
| 2,940,507 | Butler | June 14, 1960 |